United States Patent [19]

Helgerson

[11] 3,989,846

[45] Nov. 2, 1976

[54] RUMINANT AND MONOGASTRIC ANIMAL FEED AND FOOD SUPPLEMENT

[75] Inventor: Candace Kay Helgerson, Mitchell, Nebr.

[73] Assignee: Blue J Feeds, Inc. Morrill, Nebraska

[22] Filed: June 10, 1975

[21] Appl. No.: 585,500

[52] U.S. Cl. .......................... 426/2; 426/69; 426/807

[51] Int. Cl.$^2$ .......................... A23K 1/22

[58] Field of Search .......... 426/69, 89, 290, 807, 426/2; 71/28

[56] References Cited

UNITED STATES PATENTS

| | | | |
|---|---|---|---|
| 2,687,354 | 8/1954 | Gribbins | 426/69 |
| 3,441,539 | 4/1969 | Schafer et al. | 71/28 |
| 3,649,598 | 3/1972 | Namioka et al. | 71/28 |
| 3,677,736 | 7/1972 | Formaini | 71/28 |

*Primary Examiner*—Raymond N. Jones
*Assistant Examiner*—R. A. Yoncoskie
*Attorney, Agent, or Firm*—David H. Hill; Robert E. Harris

[57] ABSTRACT

An improved feed and food supplement composition for ruminant and monogastric animals including humans and a method for its preparation where urea and an aldehyde are reacted alone or in the presence of a catalyst which is effective to promote a reaction between the urea and the aldehyde and which also provides nutrients for the ruminant and monogastric animal, using water as a medium for the reaction.

18 Claims, No Drawings

RUMINANT AND MONOGASTRIC ANIMAL FEED AND FOOD SUPPLEMENT

BACKGROUND OF THE INVENTION

This invention relates to a feed and food supplement composition for ruminant and monogastric animals including humans; this group hereafter referred to as ruminant and monogastric animals, and more particularly to a ruminant and monogastric animal feed and food supplement containing an indirect source of protein which is made available to the ruminant and monogastric animal at a controlled rate during the digestive processes of the ruminant and monogastric animal.

Ruminant feed supplement compositions currently in use are most frequently formulated to include, in addition to trace amounts of minerals, urea as an indirect source of protein in a mixture with vegetable nutrients. It is believed that the urea contained in the feed supplement compositions is converted during the digestive processes of the ruminant and monogastric animals to ammonia which in turn is an intermediate in the production of protein by the ruminant's metabolic processes. Feeds for monogastric animals are not presently formulated containing urea, although these animals have some capabilities to utilize small amounts of non-protein nitrogen. Hydrolysed urea produces larger amounts of ammonia than the monogastric animal can use immediately. Because ruminant and monogastric animals have the capacity of converting the urea to ammonia at a rate significantly greater than the rate at which ammonia is converted to protein, the use of urea in feed compositions must be carefully controlled. The supply of excess amounts of urea to ruminants and monogastric animals frequently results in the absorption of ammonia in the bloodstream, commonly referred to as alkalosis, which can be fatal to ruminant and monogastric animals.

OBJECT OF THE INVENTION

It is accordingly an object of the present invention to provide a ruminant and monogastric animal feed and food supplement composition which overcomes the foregoing disadvantages, and it is a more specific object of the present invention to produce and to provide a method for producing a feed and food supplement composition containing urea as an indirect source of protein in which the urea is made available to a ruminant and monogastric animal at a controlled rate during digestive processes.

DESCRIPTION OF THE INVENTION

The concepts of the present invention reside in a feed and food supplement composition for ruminants and monogastric animals in which a mixture of urea and an aldehyde is dispersed in water and reacted in the presence of a catalyst. The catalyst is one which is not only operative to promote the reaction between urea and the aldehyde, but preferably is also operative to provide a source of nutrients for ruminant and monogastric animals. Without limiting the present invention as to theory, it is believed that the urea reacts with at least the aldehyde to provide urea-aldehyde condenstes in the medium. The condensates produced include not only water-soluble condensates but also high molecular weight water-insoluble condensates and these condensates, and particularly the water-soluble condensates, serve to control the rate at which urea and consequently ammonia is available during the digestive processes of a ruminant and monogastric animal.

It is known, and is described in U.S. Pat. No. 2,687,354, that urea-aldehyde condensation products can be employed in feed compositions for the purpose of controlling the availablity of urea and hence controlling the ammonia level in the ruminant animal. However, urea and aldehyde can be reacted together so that while the urea is no longer toxic to the animal, it is bound so tightly that it is no longer available for the animal to use efficiently as a nutrient. U.S. Pat. No. 2,687,354, describes a urea-formaldehyde condensation product having insoluble reaction products between 20 and 65% and unreacted urea between 5 and 20%. The reaction between urea and formaldehyde is such that one mole of formaldehyde is needed to react with each mole of urea reacted:

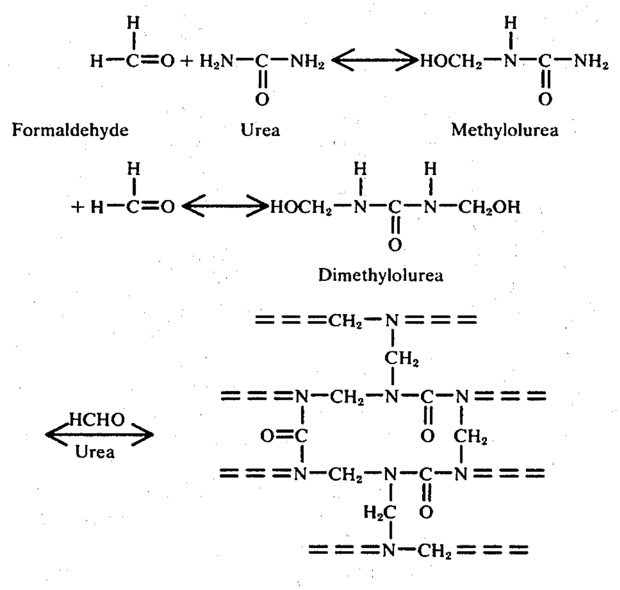

For the compound to contain maximum 20% unreacted urea, formaldehyde and urea must be present in at least the ratio of one mole formaldehyde to one mole urea in the remaining 80% of the compound. This would mean a minimum of 26.67% formaldehyde and 53.33% reacted plus 20% unreacted urea by weight present. This would be a mole ratio of aldehyde to urea of 1:1.375 for the upper limiting range. By using this ratio Gribbens has achieved a very slow release of the ammonia from the urea - but since the percentage of insoluble reaction products is so high a large part of the nitrogen consumed is lost through the feces of the animal, as the ammonia is not all released before the product passes through the digestive system of the animal.

While it is an objective of this invention to provide a safe source of indirect protein for ruminant and monogastric animals, it is the primary objective of this invention to provide an indirect protein supplement source as an effective as natural protein supplements.

A wide variety of aldehydes can be used in the practice of this invention. Preferred are those aldehydes or derivates thereof which yield $C_1$—$C_3$ aliphatic aldehydes under the conditions of the reaction. Thus, use can be made of formaldehyde, acetaldehyde, or propionaldehyde as such or in the form of aqueous solutions, either in polymerized or in unpolymerized form, or mixtures of such $C_1$—$C_3$ aldehydes may also be used.

Since the reaction of the present invention is a liquid phase reaction, it is generally preferred to employ the aldehyde in the liquid form. For example, use can be made of formaldehyde as a 37% solution commonly referred to as formalin.

In the practice of the invention, urea may be employed as such, dissolved in water, but it is preferred to employ all of the aldehyde and part of the urea in the form of urea which has been pre-reacted with an aldehyde such as formaldehyde in aqueous medium. For example, use can be made of an Allied Chemical urea-formaldehyde condensate sold under the trademark "UFC 85" which is a pre-condensate containing 60% formaldehyde, 25% urea, and 15% water. The relative amounts of urea and formaldehyde employed in the preparation of the feed supplement composition of this invention can be varied within fairly wide ranges. In general, results are obtained when use is made of a mole ratio of aldehyde to urea from the range of 1:2.5 to mole ratios of 1:8.6. The most preferred ratio of aldehyde to urea has been found to be about 1:6.5 to about 1:7.5. When the catalyst utilized in the condensation reaction provides a source of nutrients, such as when ammonium sulfate is the catalyst, it has been found that the most preferred ratio of aldehyde to catalyst (e.g. Ammonium Sulfate) is about 1:0.07 to about 1:1.1. The next preferred ratio of aldehyde to urea to catalyst is from about 1:6.5:0.07 to about 1:7.5:1.1. Although a catalyst is not necessary to bring about the successful reaction of the products, its use brings about greater economy in production of the product and makes the reaction more easily controlled.

As indicated, the reaction between the aldehyde and the urea in the practice of this invention may be carried out in the presence of a catalyst which serves to promote the reaction between the urea and the aldehyde and which preferably also serves as a source of nutrients to the ruminant animal. Accordingly, the preferred catalyst for use in the present invention include ammonium sulfate, phosphoric acid, ammonium phosphate, ammonium polyphosphate, and mixtures thereof, although hydrochloric acid, sulfuric acid, or other known catalysts can be used. The amount of catalysts employed is normally an amount within the range of none up to about 0.40 parts by weight of the catalyst per part by weight of urea in the reaction mixture.

The reaction between the urea and the aldehyde is preferably carried out in aqueous medium in order to provide a reaction mixture having a relatively low viscosity. The amount of water present during the reaction can generally be varied within fairly wide limits. For most applications it is preferred to employ a reaction mixture containing from 1 to 2.0 parts by weight of water per part by weight of urea.

The reaction is preferably carried out at ambient temperatures, although higher or lower temperatures in the range of about 5° – 90° C can be employed as desired. Generally higher temperatures favor more rapid reaction rates whereas lower temperatures increase the viscosity.

Following the reaction between the aldehyde and the urea, the aqueous liquid reaction mixture may be mixed with an edible carrier and dried to facilitate handling. Any conventional feed or food product such as corn, hay, beet pulp, wheat flour, soybean flour, etc. or any inorganic chemical material not injurious to the species consuming the product may be used as a carrier. In general, the urea-aldehyde reaction product may be mixed with a carrier in a weight ratio of from about 0.1 to 4.0 parts by weight of reaction product per part by weight of carrier. The liquid reaction mixture can also be dried as it is and used as such.

Having described the basic concepts of the invention, reference is now made to the following examples which are provided by way of illustration, and not by way of limitation, in the practice of the invention.

EXAMPLE 1

Into a reaction vessel equipped with an agitator there are introduced at ambient temperature 35 parts by weight of water, 34.4 parts by weight of urea, and 1.1 parts by weight ammonium sulfate. These three constituents are agitated until all urea and ammonium sulfate are dissolved. To this liquid, 4.3 parts by weight of a precondensate of urea and formaldehyde (UFC 85) are added and agitated to disperse the same evenly in the solution. To this solution are added 25.2 parts by weight of beet pulp. This mixture can be used as it is, for a feed supplement, or it can be dried to facilitate handling and storage. The beet pulp carrier makes this a loose, fluffy product. The urea formaldehyde condensate is present as a white product on the beet pulp. The computed reaction product reveals the presence of no unreacted formaldehyde.

EXAMPLE 2

Using the procedure described in Example 1, mix together 81.5 parts by weight water, 15 parts by weight urea, and 2 parts by weight ammonium sulfate until all ingredients are in solution. To this, add 1.5 parts by weight of UFC 85 and mix, to insure uniformity. This mixture can be used as a liquid protein supplement. The computed reaction product contains no free formaldehyde.

EXAMPLE 3

Using the procedure described in Example 1, add 30 parts by weight water and 21 parts by weight urea to the reaction vessel and agitate until all urea is dissolved. Add 0.5 parts by weight 85% Phosphoric Acid and agitate to disperse in solution. To this solution, add 6.3 parts by weight UFC 85 and disperse in the solution. Add 42.2 parts by weight ground corn and mix into solution. To ease handling the mixture can be dried. The urea formaldehyde condensation product is present as a white compound on the corn particles. This mixture can be used as a high protein food or feed or can be mixed with other feed materials to make a balanced diet. The computed reaction product reveals the presence of no free formaldehyde.

EXAMPLE 4

Into a reaction vessel equipped with an agitator and a source of heat, introduce 35 parts by weight of water and 30 parts by weight of urea. Agitate and heat this mixture until all the urea is dissolved and the temperature of the solution is 60° C. Add 6 parts by weight UFC 85, agitate until dispersed in solution uniformly and add 29 parts by weight dehydrated alfalfa and mix. This mixture can be used as a protein supplement. The computed reaction product contains no unreacted formaldehyde.

Whiteface crossbred wether lambs were randomly allotted into groups to compare urea, urea-formaldehyde condensates, and natural protein supplements. Rations were compared of the following:

Table 1

| | Composition of Rations | | | | | |
|---|---|---|---|---|---|---|
| | Natural Protein | Urea-Aldehyde Condensation Products No. 1 | Urea-Aldehyde Condensation Products No. 2 | Urea-Aldehyde Condensation Products No. 3 | Regular Urea | Negative Control |
| | % | % | % | % | % | % |
| Wheat Hay | 78.7 | 77.8 | 77.8 | 77.8 | 78.4 | 78.7 |
| Shelled Corn | 10.0 | 16.9 | 16.9 | 16.9 | 18.4 | 20.0 |
| Dicalcium Phosphate | 1.0 | 1.0 | 1.0 | 1.0 | 1.0 | 1.0 |
| Vitamin A & D Premix | .1 | .1 | .1 | .1 | .1 | .1 |
| Trace Mineral Premix | .2 | .2 | .2 | .2 | .2 | .2 |
| Soybean Meal | 10.0 | — | — | — | — | — |
| Urea | — | — | — | — | 1.6 | — |
| Urea-Aldehyde Condensation products premix (non-protein nitrogen source) | — | 3.7[1] | 3.7[2] | 3.7[3] | — | — |
| Calcium Sulfate | — | .325 | .325 | .325 | .325 | — |
| <u>%Crude Protein</u> | | | | | | |
| Dry Matter Basis | 13.2 | 15.7 | 15.7 | 15.1 | 14.8 | 10.2 |
| 90% Dry Matter Basis | 11.9 | 14.1 | 14.1 | 13.6 | 13.3 | 9.2 |

[1]Premix contains total protein of 151.1%, of which 3.6% is from Natural Crude protein sources and 147.5% Crude Protein equivalent is from non-protein nitrogen sources, considering a dry matter basis.
[2]Premix contains total protein of 151.3% of which 3.8% is from Natural Crude protein sources and 147.5% Crude Protein equivalent is from non-protein nitrogen sources, considering a dry matter basis.
[3]Premix contains total protein of 146.5%, of which 3.0% is from Natural Crude protein sources and 143.5% Crude Protein equivalent is from non-protein nitrogen sources, considering a dry matter basis.

Urea-aldehyde condensate No. 1 contains a mole ratio of formaldehyde to urea of 1:4.375; urea-aldehyde condensate No. 2 contains a mole ratio of formaldehyde to urea to catalyst (ammonium sulfate) of 1:6.9:.09; and urea-aldehyde condensate No. 3 contains a mole ratio of formaldehyde to urea of 1:3.

The lambs were individually weighed at the beginning and end of a 30 day preliminary period and the beginning and end of a five day period during which all urine and fecal material were collected. The lambs were individually housed in standard metabolism cages which allowed for the total collection of feces and urine separately.

Weight gains and feed intake are shown in Table 2:

Table 2

| | Weight Gains and Feed Intake | | | | | |
|---|---|---|---|---|---|---|
| | Natural Protein | Urea-Aldehyde Condensation Products No. 1 | Urea-Aldehyde Condensation Products No. 2 | Urea-Aldehyde Condensation Products No. 3 | Urea | Negative Control |
| Average initial weight January 4 | 107.3 | 94.2 | 97.2 | 85.8 | 88.0 | 98.8 |
| <u>Weight gains - pounds</u> | | | | | | |
| Preliminary period - January 4 - February 4 | 6.2 | 9.0 | 6.5 | 9.0 | 8.3 | 10.8 |
| Collection period - February 4 - February 9 | 0.6– | .3 | 1.0 | 0.8 | 2.7 | 1.0 |
| Total Period January 4 - February 9 | 6.8 | 8.7 | 7.5 | 9.8 | 11.0 | 11.8 |
| <u>Daily Feed Intake During Collection Period - Grams</u> | | | | | | |
| Dry Matter | 1187 | 1129 | 1176 | 1091 | 1098 | 1214 |
| Dry Matter/weight .75 (1) | 61.8 | 63.1 | 65.5 | 65.0 | 64.6 | 64.9 |

(1)Feed intake in grams per unit of metabolic size

The digestibility and nitrogen balance data are given in Table 3:

Table 3

Digestibility and Nitrogen Balance Data

| | Natural Protein | Urea-Aldehyde Condensation Products No. 1 | Urea-Aldehyde Condensation Products No. 2 | Urea-Aldehyde Condensation Products No. 3 | Urea | Negative Control |
|---|---|---|---|---|---|---|
| Digestibility Coefficients (%) | | | | | | |
| Dry Matter[1] | 67.8 | 65.0 | 67.3 | 65.2 | 65.4 | 64.0 |
| Crude Protein[1] | 73.9 | 75.5 | 74.2 | 68.4 | 74.3 | 58.6 |
| Nitrogen Balance - gram/day | | | | | | |
| Nitrogen Intake | 25.2 | 28.5 | 29.5 | 26.5 | 26.0 | 19.9 |
| Fecal Nitrogen | 6.6 | 7.0 | 7.7 | 8.4 | 6.7 | 8.2 |
| Urinary Nitrogen | 11.7 | 12.7 | 13.1 | 11.2 | 11.5 | 4.8 |
| Nitrogen retention | 6.8 | 8.8 | 8.8 | 6.8 | 7.8 | 6.9 |
| Percent of dietary nitrogen retained | 27.1 | 31.0 | 29.7 | 25.6 | 30.2 | 34.6 |

[1]Expressed on a dry matter basis

In this study, urea-formaldehyde condensates Nos. 1 and 2 performed equal to or superior to soybean meal as a nitrogen source for growing ruminants. Although urea-formaldehyde condensate No. 3 shows slowed release of ammonia to the animal, it is approaching the stage where binding is so tight that it is less available to the animal than necessary for maximum utilization.

Table four shows the daily weight gain for a 140 day period for feedlot cattle fed soybean meal, urea and urea-formaldehyde condensate products as the protein supplements in regular growing and fattening feedlot rations. Urea-formaldehyde condensates 1 and 2 are of the same composition as Nos. 1 and 2 in the previous test.

| Protein Supplement | Pounds/day gain for 140 days |
|---|---|
| Soybean Meal | 2.13 |
| Urea | 1.86 |
| Urea-formaldehyde Condensate No. 1 | 1.77 |
| Urea-formaldehyde Condensate No. 2 | 2.06 |

Rats (monogastric animal) fed a mixture containing urea-formaldehyde condensates for a period of seven months showed no toxic effects. Rats fed a mixture containing 35% protein, 20% (57% of total diet protein) from urea-formaldehyde condensates gained in 30 days 3 grams more per rat than rats fed the same feed without the urea-formaldehyde condensate.

The invention being thus described, it will be obvious that the same may be varied in different ways to produce the results disclosed, and such variations are not to be regarded as a departure from the spirit and scope of the invention, and all such variations or modifications as would be obvious to one skilled in the art are intended to be included herein.

I claim:

1. A process for feeding ruminant and monogastric animals, which comprises:

adding to the diet of ruminant and monogastric animals a feed product formed by reacting urea in an aqueous medium, at a temperature in the range of about 5°–90° C., with a urea-aldehyde pre-condensate or with a member selected from the group consisting of $C_1$–$C_3$ aliphatic aldehydes, polymers of $C_1$–$C_3$ aliphatic aldehydes and mixtures thereof, the mole ratio of aldehyde to urea being from about 1:3 to about 1:8.6, and feeding said feed product to said animals in an amount sufficient to provide urea as an indirect source of protein in which the urea is made available to said animals at a controlled rate during said animals' digestive processes.

2. The process of claim 1, wherein the reaction between the urea and aldehyde constituents is carried out in the presence of a catalyst.

3. The process of claim 1, wherein the reaction between the urea and aldehyde constituents is carried out in the presence of a catalyst which serves both to promote the reaction between the urea and aldehyde constituents and to provide a source of nutrients for ruminant and monogastric animals.

4. The process of claim 3, wherein the catalyst is a member selected from the group consisting of ammonium sulfate, phosphoric acid, ammonium phosphate, ammonium polyphosphate and mixtures thereof.

5. The process of claim 1, wherein the reaction mixture comprises from about 1–2 parts by weight of water per part by weight of urea.

6. The process of claim 2, wherein the reaction mixture includes up to about 0.4 parts by weight of catalyst per part by weight of urea.

7. The process of claim 1, wherein the mole ratio of aldehyde to urea is from about 1:6.5 to about 1:7.5.

8. The process of claim 2, wherein the mole ratio of aldehyde to catalyst is from about 1:0.07 to about 1:1.1.

9. The process of claim 1, wherein the reaction product is mixed with an edible carrier and dried.

10. An improved feed and food supplement for ruminant and monogastric animals comprising the reaction product of urea with a $C_1$–$C_3$ aliphatic aldehyde or a urea-aldehyde pre-condensate, or a polymer of a $C_1$–$C_3$ aliphatic aldehyde, the mole ratio of aldehyde to urea in said reaction product being from about 1:3 to 1:8.6, said reaction product being formed at a temperature in the range of about 5°–90° C.

11. The feed composition of claim 10, further including a member selected from the group consisting of ammonium sulfate, phosphoric acid, ammonium phosphate and ammonium polyphosphate and mixtures thereof.

12. The feed composition of claim 11, wherein the mole ratio of aldehyde to said member is from about 1:0.07 to about 1:1.1.

13. The feed composition of claim 10, wherein said mole ratio of aldehyde to urea in said reaction product is from about 1:6.5 to 1:7.5.

14. The feed composition of claim 10, further including an edible carrier.

15. The feed composition of claim 11, further including an edible carrier.

16. An improved feed and food supplement for ruminant and monogastric animals comprising the reaction product of urea with formaldehyde, a urea-formaldehyde pre-condensate, a polymermic formaldehyde or mixtures thereof, the mole ratio of formaldehyde to urea in said reaction product being from about 1:3 to 1:8.6, said reaction product being formed at a temperature in the range of about 5°–90° C.

17. The feed composition of claim 16, further including a catalyst which promotes the formation of said reaction product.

18. The feed composition of claim 16, wherein said mole ratio of formaldehyde to urea in said reaction product is from about 1:6 to 1:7.5.

* * * * *